United States Patent

[11] 3,543,863

| [72] | Inventors | Glenn A. Ball;<br>Eugene L. Helton, Peoria, Illinois |
|---|---|---|
| [21] | Appl. No. | 705,488 |
| [22] | Filed | Feb. 14, 1968 |
| [45] | Patented | Dec. 1, 1970 |
| [73] | Assignee | Caterpillar Tractor Co.<br>Peoria, Illinois<br>a corporation of California |

[54] QUICK DETACH BUCKET MOUNTING
4 Claims, 3 Drawing Figs.

[52] U.S. Cl. .................................................. 172/273,
37/118; 287/88, 100; 308/29, 31, 72, 63, 244
[51] Int. Cl. ............................................................ A01b 51/02
[50] Field of Search............................................ 172/273,
464; 308/29, 31, 63, 244, 72; 287/100, 88;
37/117.5, 118

[56] References Cited
UNITED STATES PATENTS

| 1,635,753 | 7/1927 | Johnson ...................... | 308/244 |
| 2,308,613 | 1/1943 | Le Tourneau ................ | 287/88 |
| 2,924,345 | 2/1960 | Bodin ........................... | 37/117.5X |
| 2,931,446 | 4/1960 | Gwinn ........................... | 172/464 |
| 2,967,726 | 1/1961 | Weston ......................... | 287/100 |

Primary Examiner—Robert E. Pulfrey
Assistant Examiner—Alan E. Kopecki
Attorney—Fryer, Tjensvold, Feix, Phillips & Lempio ABSTRACT: A bucket mounting to facilitate changing from one bucket or implement to another, mounted on an end loader comprising a bearing set mounted in the arm of an end loader and capturing a pin therein. Mounting blocks cooperating with the implement are fastened on the longitudinal ends of the pin.

Patented Dec. 1, 1970

3,543,863

INVENTORS
GLENN A. BALL
EUGENE L. HELTON

BY
Fryer, Tjensvold, Feix, Phillips & Lempio
ATTORNEYS

QUICK DETACH BUCKET MOUNTING

Many end-loading vehicles upon which a bucket is mounted can be suitably used for the operation of other implements mounted on lift arm. In fact, such a vehicle has a very high degree of utility when the implements may be interchanged with ease and speed.

With presently known equipment however, the changeover from one implement to another is extremely difficult. In the usual arrangement, the implement is held to the end loader by a pair of pins in the lift arm and another pair of pins at the ends of the tilt links.

Many end loaders have an arrangement wherein the alinement of the bores in which the pins are located is highly critical and requires line reaming after the bores of the implement and those of the end loader are placed in coaxial relationship. This in turn means that manufacture as well as repair of such vehicles is often difficult and expensive.

Often the pins wear into stepped portions or seize in the bores for other reasons. In many cases, it requires two men and heavy hand equipment to remove the pins. As a result, many users of such vehicles are required to perform a large number of operations with an implement not suited for all of the jobs.

It is therefore an object of this invention to provide an improved mounting device for an end loader implement.

It is also an object of the present invention to provide an end loader implement mounting device which is simple and inexpensive to manufacture.

It is a further object of the present invention to provide such device which is easy to maintain and repair.

It is also an object of the present invention to provide such a device which will allow quick and easy substitution of implements on the end loader.

Other objects of the invention will become apparent upon review of the following description and the accompanying drawing.

Figure 1:
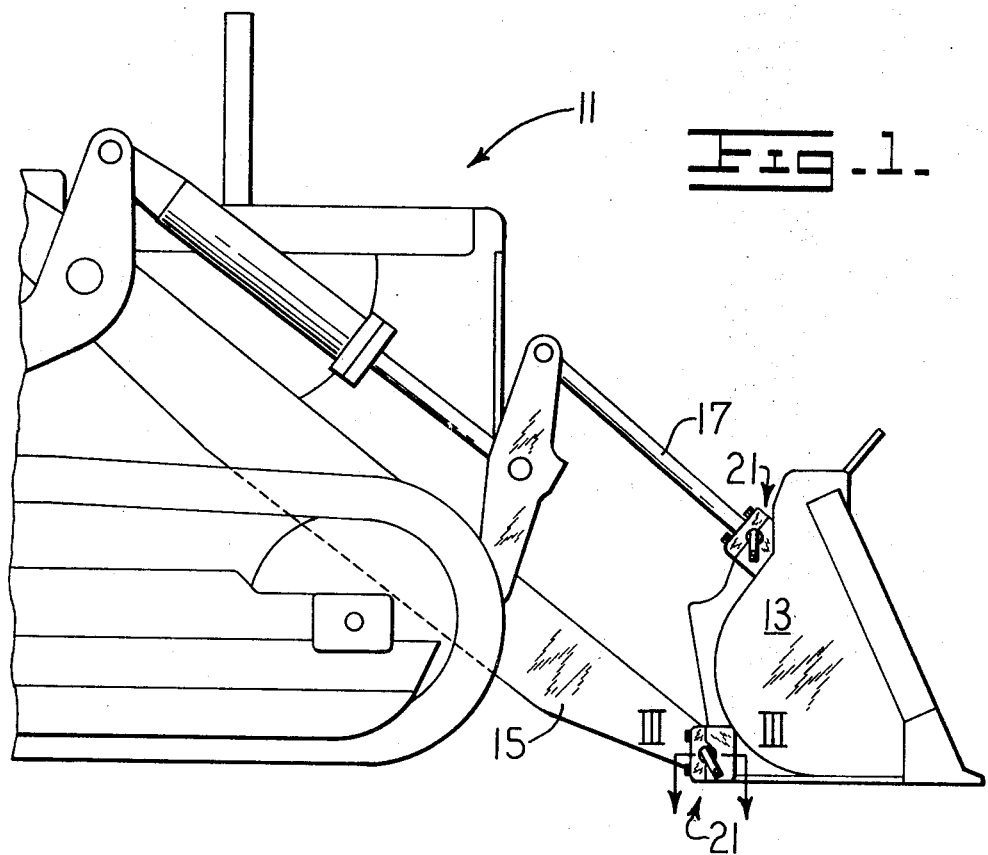
FIG. 1 shows a side view of an end loader vehicle utilizing the quick detach bucket mounting.

Referring now to the drawing in greater detail, there is shown in FIG. 1 a tractor-type vehicle 11 to which is attached a loading implement such as a bucket 13. The bucket is attached to the vehicle by means of lift arms 15 and one or more tilt links 17, all of which act through similar mounting assemblies 21.

Each assembly 21 is fixed to the bucket by means of cooperating clamp or bearing cap members 23 and 25. The clamp members 23 are suitably attached to the bucket such as by welding and in the assembled position, clamp members 25 are fastened to the members 23 by means such as bolts 27.

Figure 2:
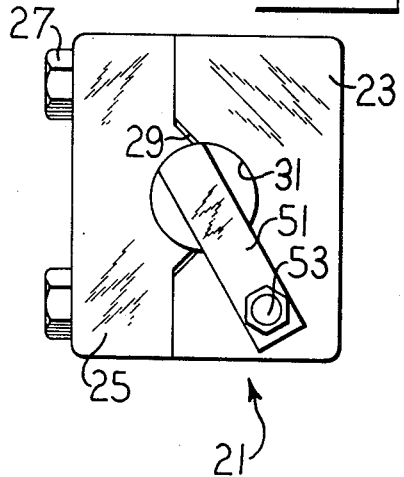
FIG. 2 shows a side view of the mounting itself.

As shown in FIG. 2, member 23 has a V-shaped slot 29 and the cap 25 has a mating projection for cooperation with the slot.

Members 23 and 25 when assembled form a bore 31 which captures the ends of a pin 33. The pin contains a spherical midsection 35 which is held in place between a mating pair of spherical bushings 37 and 39 which, in turn, are held in a bore 41 of lift arm 15 or tilt arm 17 by bolts or other suitable means 43.

Figure 3:
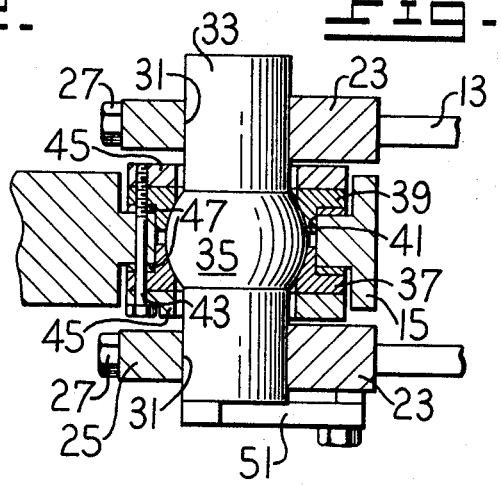
FIG. 3 shows a sectional view of the mounting taken along a line III–III of FIG. 1.

So as to minimize wear damage and aid in positioning the assembly, wear washers 45 and shims 47 may be utilized with the bushings as shown in FIG. 3. As the bushings become worn, the shims may be removed and the bushing life thereby extended.

A locking bar 51 is attached to one end of pin 53 and is held to the member 23 by any suitable means such as a bolt 53 or by being placed between a pair of lugs integral with member 23 so as to prevent pin 33 from rotating relative to the clamps while allowing some side shifting of the pin in relation to the bucket during assembly. Thus, the bar prevents the pin from rotating in the caps and forces the rotation to occur about the spherical ball section.

When it is desired to change the implement on the vehicle, bolts 27 may be removed from each of the clamps 21 allowing separation of members 23 and 25. Since the pin is held in place relative to the lift arm or tilt link by means of the bushings 37 and 39, reassembly with a new implement can be accomplished by putting the end of the pin within a bore similar to bore 31 formed between bearing caps similar to 23 and 25 associated with the new implement.

Thus has been disclosed a quick detach bucket mounting which is inexpensive to manufacture and which allows much speed and ease in replacing one end loading implement with another.

We claim:

1. A vehicle having an implement detachably mounted on a member thereof, said member having a pivot pin mounted in a socket bearing arrangement fixedly mounted thereon, said pivot pin having end portions extending laterally outwardly to respective sides of said member, and means detachably connecting each end portion of said pin to said implement and forming bores therewith for retaining said pin end portions therein whereby various implements may be attached to said vehicle without removing said bearing arrangement therefrom, each of said connecting means comprising a first clamp member detachable connected by removable fastening means to a cooperating second clamp member secured to said implement, each cooperating pair of first and second clamp members respectively defining first and second portions of one of said bores therein, means forming a V-shaped projection on each of said first clamp members and means defining a V-shaped slot on each of said second clamp members having a respective one of said V-shaped projections seated therein and terminating in a second bore portion whereby the end portions of said pins will be precisely guided into said second bore portions upon attachment of said implement to said member.

2. The invention of claim 1 wherein said pin is fixed to said vehicle by a wear absorbing means fixed to said vehicle.

3. The invention of claim 2 including means for adjusting said wear absorbing means so as to compensate for wear therein.

4. The invention of claim 1 further comprising means attached to said implement and to said pin for preventing relative rotation from occurring therebetween.